(12) United States Patent
Crawford et al.

(10) Patent No.: US 8,186,097 B2
(45) Date of Patent: May 29, 2012

(54) FISH CULLING SYSTEM

(75) Inventors: Jeffrey E. Crawford, La Plata, MO (US); Brandon P. Gray, Macon, MO (US); Jacob Thomas Tippee, Wildwood, MO (US)

(73) Assignee: Ardent Outdoors, Inc., St. Louis, MO (US)

( * ) Notice: Subject to any disclaimer, the term of this patent is extended or adjusted under 35 U.S.C. 154(b) by 603 days.

(21) Appl. No.: 12/075,850

(22) Filed: Mar. 14, 2008

(65) Prior Publication Data

US 2009/0230160 A1    Sep. 17, 2009

(51) Int. Cl.
*A01K 65/00* (2006.01)
*A01K 97/00* (2006.01)

(52) U.S. Cl. .................... 43/55; 43/4; 224/103

(58) Field of Classification Search ............... 43/4, 55, 43/43.11, 15; 224/223, 103
See application file for complete search history.

(56) References Cited

U.S. PATENT DOCUMENTS

| | | | | | |
|---|---|---|---|---|---|
| 446,535 | A | * | 2/1891 | Outerbridge | 43/43.11 |
| 541,789 | A | * | 6/1895 | Kunzelman | 43/43.11 |
| 2,092,638 | A | * | 9/1937 | Carpenter | 43/55 |
| 2,190,113 | A | * | 2/1940 | Chreitzberg | 43/43.11 |
| 2,984,040 | A | * | 5/1961 | Fogaley | 43/43.11 |
| 3,168,790 | A | * | 2/1965 | Creasey | 43/43.11 |
| 3,169,339 | A | * | 2/1965 | Ekstrand | 43/43.11 |
| 3,340,644 | A | * | 9/1967 | Lintz | 43/43.11 |
| 3,441,962 | A | * | 5/1969 | Williams | 43/43.11 |
| 3,561,652 | A | * | 2/1971 | Ruter | 224/103 |
| 3,673,729 | A | * | 7/1972 | Lintz | 43/43.11 |
| 3,878,634 | A | * | 4/1975 | Quimpo | 43/43.11 |
| 4,251,941 | A | * | 2/1981 | Howard | 43/43.11 |
| 4,328,916 | A | * | 5/1982 | Lucas | 224/103 |
| 4,477,995 | A | * | 10/1984 | Fenn | 43/43.11 |
| 4,484,405 | A | * | 11/1984 | Woods | 43/4 |
| 4,601,126 | A | * | 7/1986 | Klocksiem | 43/43.11 |
| 4,753,031 | A | * | 6/1988 | Owen | 43/4 |
| 4,856,219 | A | * | 8/1989 | Severance et al. | 43/43.11 |
| 5,048,219 | A | * | 9/1991 | Georgescu | 43/4 |
| 5,207,013 | A | * | 5/1993 | Bartok et al. | 43/4 |
| 5,440,831 | A | * | 8/1995 | Chandler | 43/43.11 |
| 5,557,878 | A | * | 9/1996 | Ross | 43/43.11 |
| 5,600,873 | A | * | 2/1997 | May | 441/6 |
| 5,761,843 | A | * | 6/1998 | Lynch et al. | 43/4.5 |
| 5,979,752 | A | * | 11/1999 | Holloway | 43/4 |
| 5,987,808 | A | * | 11/1999 | Coles | 43/55 |
| 6,044,582 | A | * | 4/2000 | Johnson | 43/4 |
| 6,862,834 | B2 | * | 3/2005 | Basch | 43/4 |
| 6,880,285 | B1 | * | 4/2005 | Frost et al. | 43/43.11 |
| 7,055,281 | B1 | * | 6/2006 | Faneuf | 43/55 |
| D585,521 | S | * | 1/2009 | Crawford et al. | D22/134 |

(Continued)

*Primary Examiner* — Darren W Ark
(74) *Attorney, Agent, or Firm* — Polster Lieder Woodruff & Lucchesi, L.C.

(57) ABSTRACT

The present invention is a culling device that comprises a cable element, a retainer element and a floating element. When in use, the device is attached to a fish by way of the retainer element, which may be a clip, hook or other suitable element. The cable element is the link between the retainer element and the floating element. The floating element provides buoyancy to the device as a whole, and serves the purpose of indicating the weight of the fish to which the device is attached. The present invention further comprises a kit, the kit potentially including a plurality of devices, a scale, or some combination thereof. The present invention further comprises a method of using a device or kit. The present invention further comprises embodiments where a device disclosed herein is used on an animal other than a fish.

10 Claims, 6 Drawing Sheets

U.S. PATENT DOCUMENTS

| | | | |
|---|---|---|---|
| 7,937,882 B2 * | 5/2011 | Mullins | 43/4 |
| 2004/0035223 A1 * | 2/2004 | Darnell et al. | 73/862.474 |
| 2005/0198890 A1 * | 9/2005 | Iliev | 43/43.11 |
| 2007/0215656 A1 * | 9/2007 | Reynolds et al. | 224/103 |
| 2007/0277424 A1 * | 12/2007 | Hale et al. | 43/43.11 |
| 2009/0107028 A1 * | 4/2009 | Mullins | 224/103 |

* cited by examiner

FISH CULLING SYSTEM

FIELD OF THE INVENTION

The present invention relates to the field of fishing accessories, and in particular to a system for keeping track of the weight of individual fish that have been caught and stored while still keeping the fish alive.

BACKGROUND OF THE INVENTION

The present invention addresses a pressing need in the art of fishing, particularly in the field of competitive fishing.

In fishing tournaments, scoring is frequently tabulated by summing the weights of all fish caught by an angler entered in the tournament over a period of time. Such tournaments almost universally have a limit on the number of fish that can be caught. As a result of these rules, fish of high weight are greatly valued. As fish are caught, typically the angler will place the fish in the boat's live well, which is a compartment within the hull of the boat accessible by the angler and controllably filled with water by the angler from the surrounding body of water. Once an angler has caught the maximum number of fish permitted by the tournament rules, he may continue fishing in the hopes that a subsequently-caught fish will weigh more than the lowest weight fish amongst those already caught.

Culling is a method of removing the fish with the smallest weight from the live well and returning it to the wild, and then replacing that fish with a more recently caught fish of a higher weight. As the tournament continues, a successful angler may be able to repeatedly replace the fish with the lowest weight with a heavier fish, thereby continuously increasing his score in the tournament. Therefore, culling is an important part of competitive fishing, and it would be highly useful to have a tool, system or method for effectively and efficiently culling fish.

BRIEF DISCUSSION OF THE PRIOR ART

The typical culling system comprises a series of colored buoyant ropes or buoyant elements at the end of a rope, each affixed to a hook or clip, and additionally comprises some means for recording the weights of each fish attached to each rope. When an angler using one of these systems catches a fish, the angler will weigh the fish and mark the fish by using a buoyant element of a given color and hooking a retaining element at the opposite end into the fish's mouth, and finally place that marked fish into the live well. The angler will then record the weight of that fish by some means that corresponds the weight to the color of the buoyant element. Therefore, the angler must not only weigh each fish and hook a marker onto the fish, but he must also separately record the weight of the fish. As fish are culled in this system, the means for recording the weights of the fish must be continuously amended. Typical means for recording the weights of fish include pen and paper, grease marker or dry erase marker on a board, electronic means, and manual means, and other time intensive and labor intensive methods, as both time and labor are at a premium during a timed fishing competition. These additional steps waste the angler's time, which would be better spent fishing. The additional equipment, such as the means for recording the weights of the fish, add to the amount of materials for the angler to carry and keep track of, all while attempting to compete in a fishing tournament. The inherent problems associated with the wet environment associated with fishing, and the exposure to the elements, can further decrease the desirability of these means for recording the weights of the fish. These and other flaws of the systems in the prior art all point to a need for simplification and ease of use, which the present invention aims to address.

SUMMARY OF THE INVENTION

The present invention is a fish culling device that comprises a cable element, a retainer element and a floating element.

When in use, the device is attached to a fish by way of the retainer element, which may be a clip, hook or other suitable element. The retainer element attaches the device to the fish such that, even when the fish is struggling, diving, swimming or otherwise moving, the device remains attached to the fish. Further, the retainer element should be one that may be removed by the angler with little difficulty.

The cable element is the link between the retainer element and the floating element, and may be made of metal, plastic, rope or any other suitable material. The cable element is attached at one end to the retainer element and is attached at the other end to the floating element. Preferably, the cable element should be durable, corrosion-resistant and flexible. Though preferably secure, the attachments need not be permanent, as one may make necessary repairs.

The floating element provides buoyancy to the device as a whole, and serves the purpose of indicating the weight of the fish to which the device is attached. Present on the floating element are two dials, one each for pounds and ounces, which can be adjusted by the angler to indicate the weight of the fish to which the device is attached. Preferably, the floating element permits the angler to adjust the dials to indicate the weight of the fish to the nearest ounce. The floating element, and the device as a whole, should be durable enough to perform even in prolonged periods of submersion in water and collision with other objects, including other floating elements.

The present invention further comprises a kit, the kit potentially including a plurality of devices, a scale, or some combination thereof. The present invention further comprises a method of using a device or kit. The present invention further comprises embodiments where a device disclosed herein is used on an animal other than a fish.

DETAILED DESCRIPTION OF THE INVENTION

Figure 1:
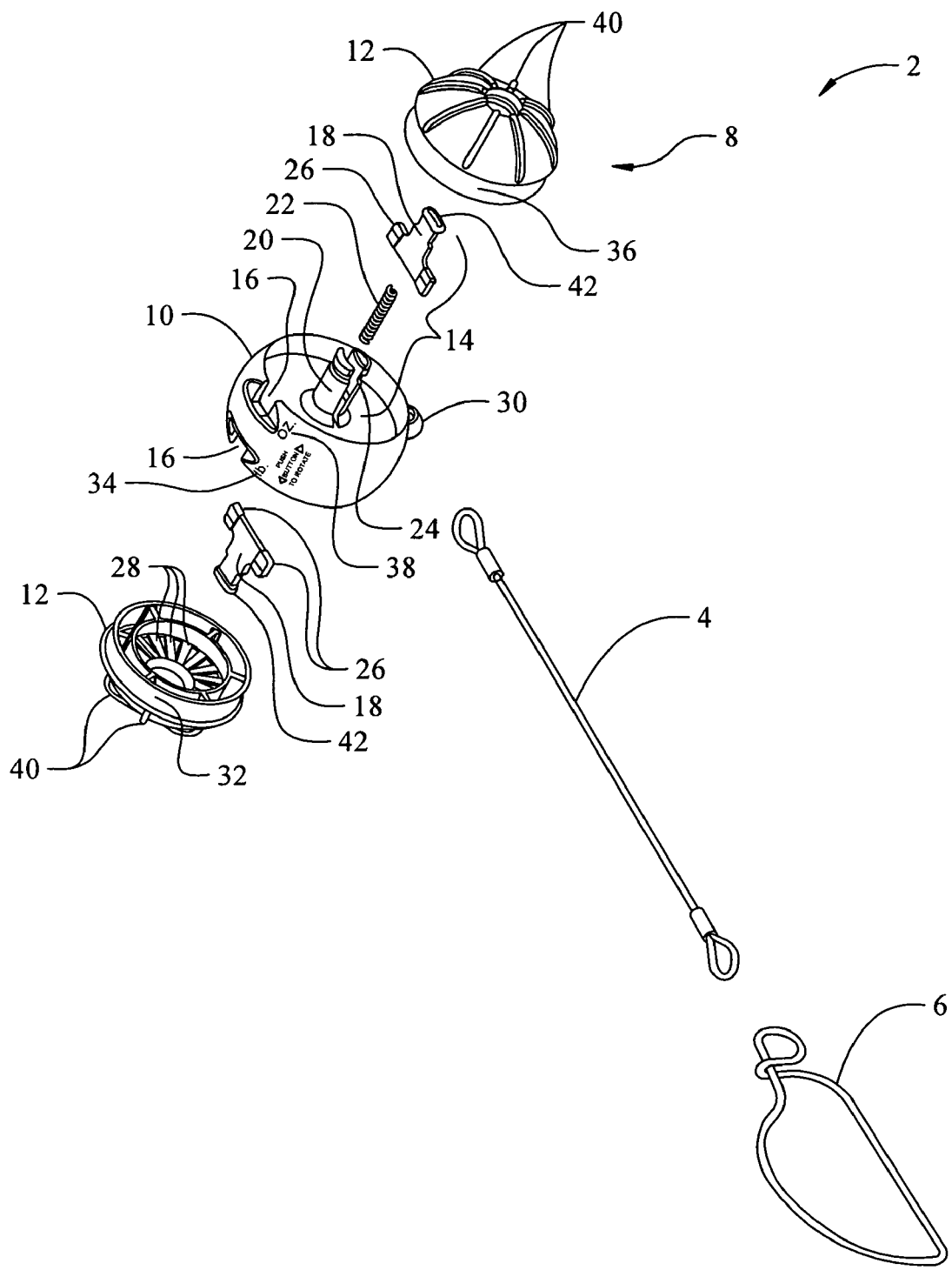
FIG. 1 is a perspective exploded view of an embodiment of the present invention.
Figure 2:
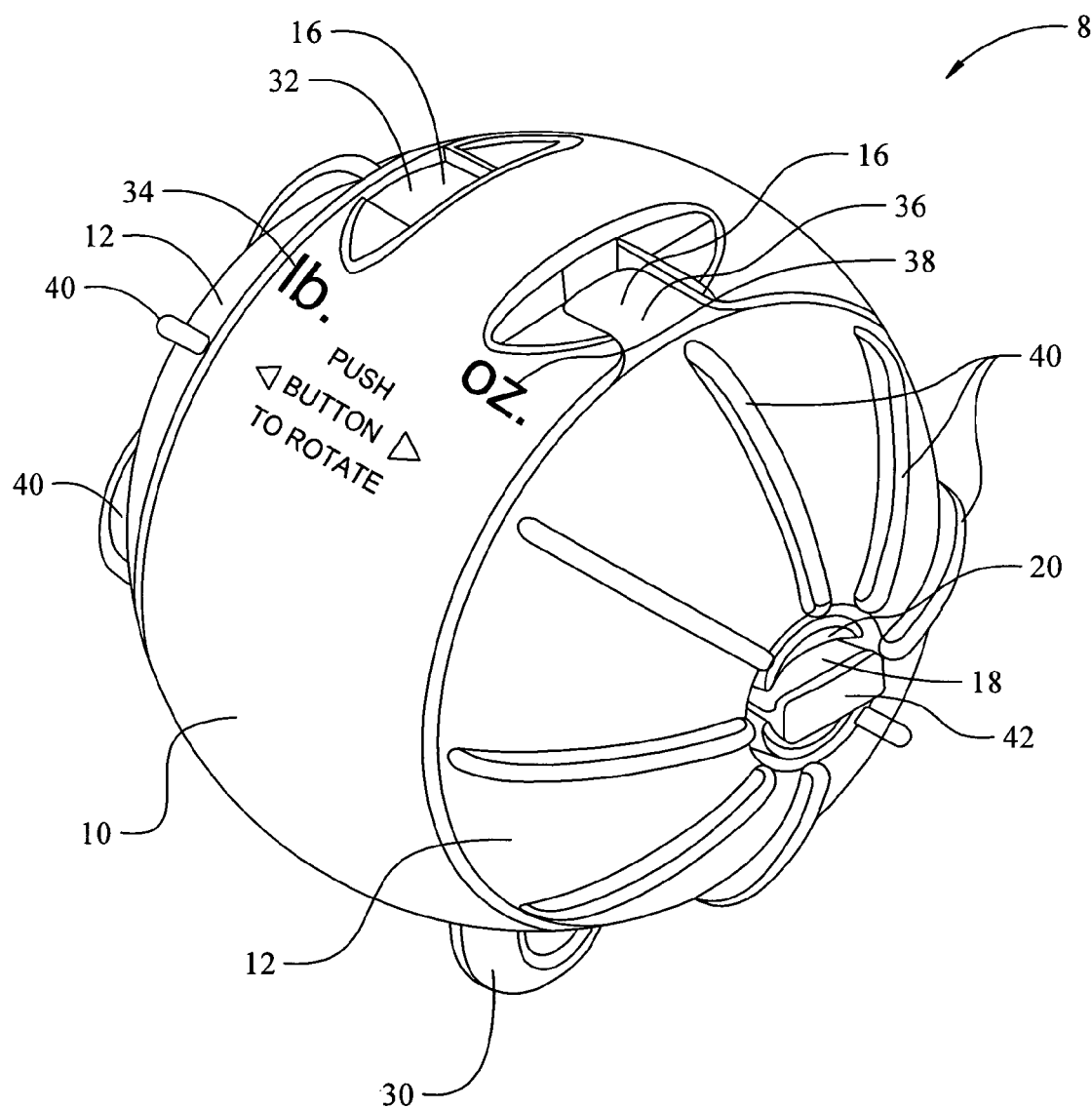
FIG. 2 is a perspective view of an embodiment of a floating element of the present invention.
Figure 3A:
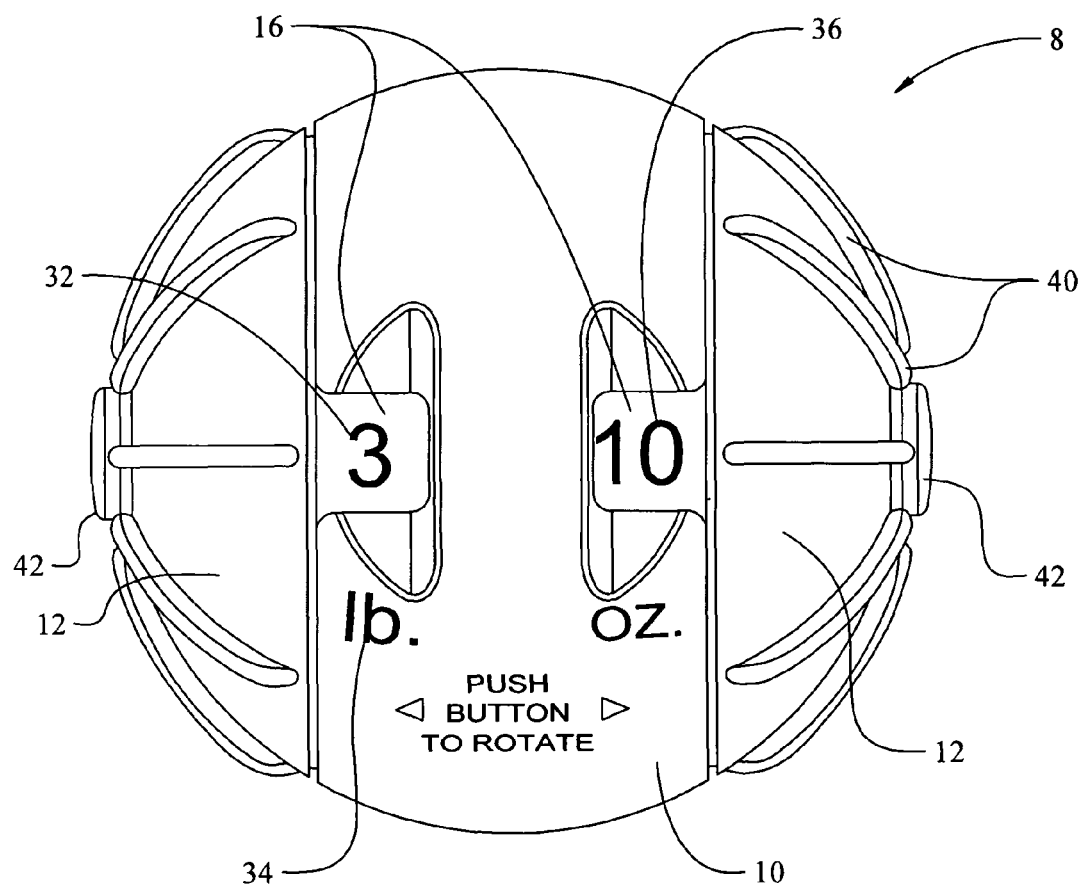
FIG. 3A is a front view of an embodiment of a floating element of the present invention.
Figure 3B:
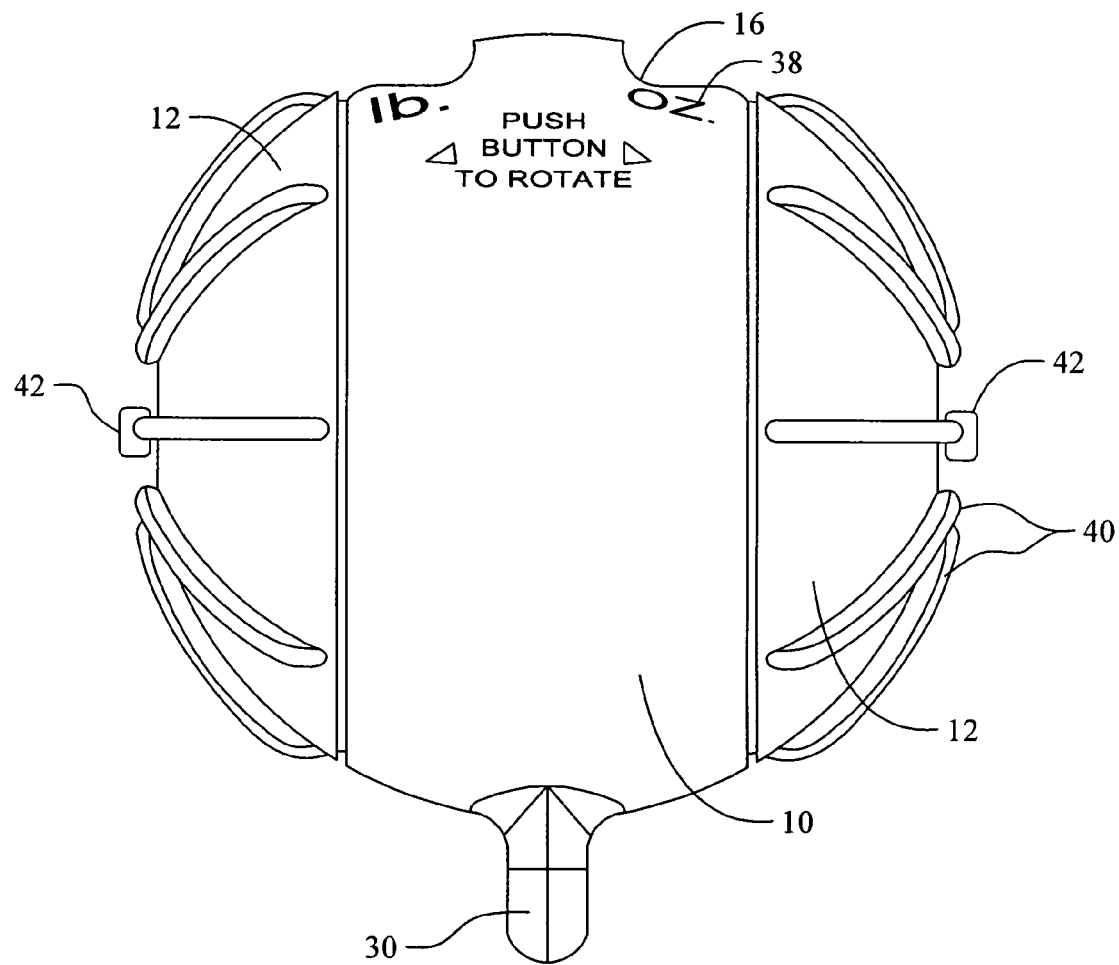
FIG. 3B is a bottom view of an embodiment of a floating element of the present invention.
Figure 3C:
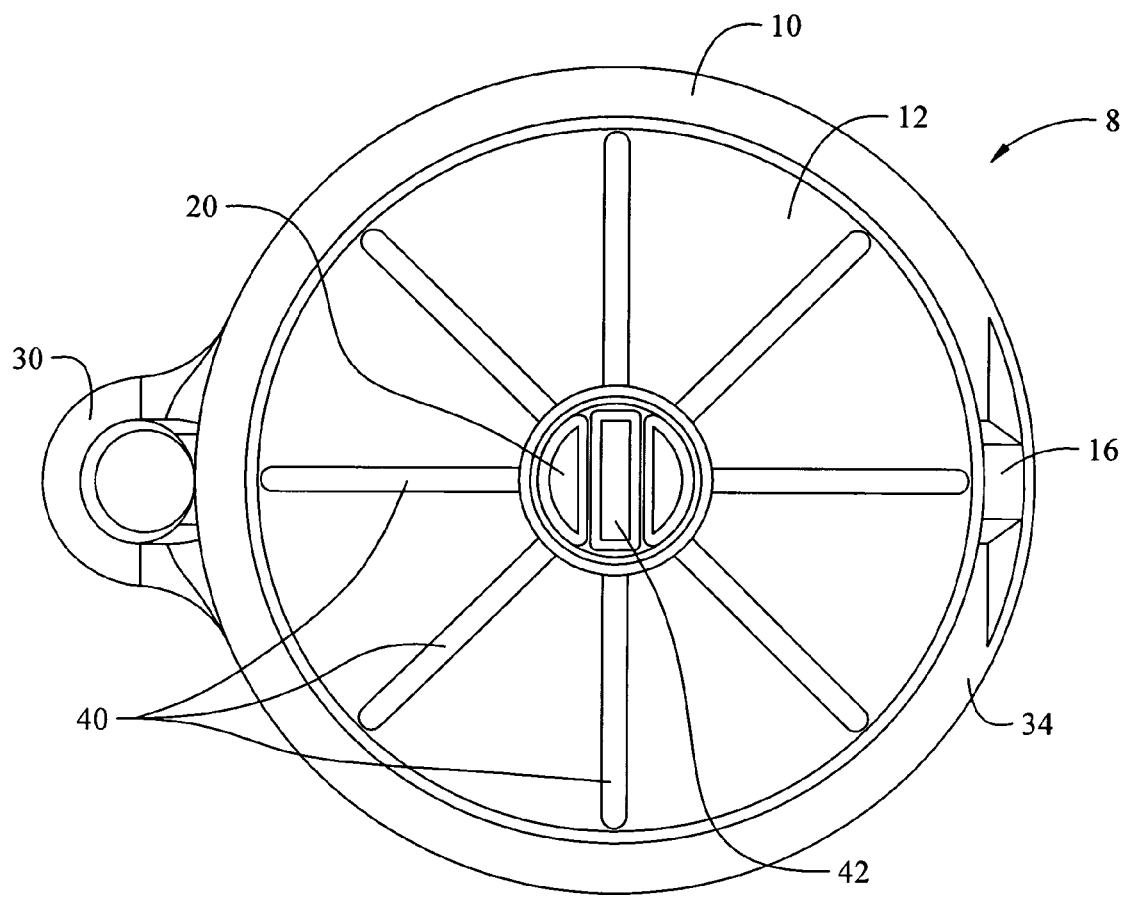
FIG. 3C is a side view of an embodiment of a floating element of the present invention.
Figure 4:
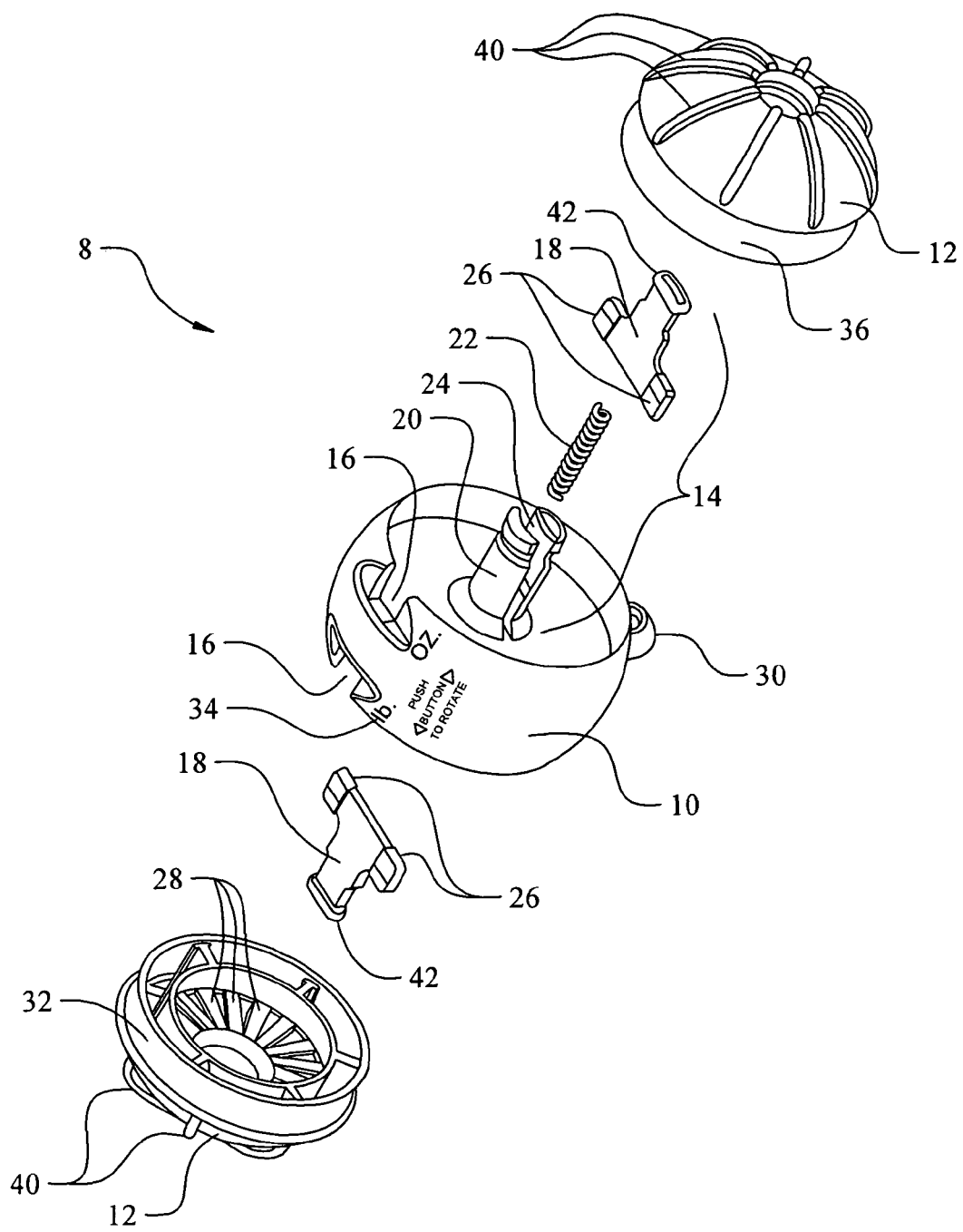
FIG. 4 is a perspective exploded view of an embodiment of a floating element of the present invention.

The present invention is a culling device 2 comprising a cable element 4, a retainer element 6 and a floating element 8. The retainer element 6 may attach the device 2 to an animal, preferably a fish. The floating element 8 comprises a center section 10 and two dial sections 12, the two dial sections being controllably adjustable to indicate the weight of the animal to which the device 2 is attached or to be attached. The cable element 4 is attached at one end to the retainer element 6 and is attached at the other end to the floating element 8.

The retainer element 6 may be comprised of any suitable material, though metal is preferred. The metal should be resilient and rustproof, given the exposure to water and the natural elements encountered when fishing. It is preferred that the retainer element 6 be a closable loop hook, one that can easily puncture the mouth of a fish and is sturdy enough to remain attached on the fish through fish activity, including struggling, swimming, diving and collision.

The cable element 4 may be comprised of any suitable material, though coated wire is preferred, and plastic-coated wire is more preferred. The cable element 4 should be resilient, non-frayable and rustproof, given the exposure to water and the natural elements encountered when fishing, and may be of any practical length. It is preferred that the cable element 4 be between about twelve inches to about eighteen inches in length.

The floating element 8 may be comprised of any suitable material that floats. It is preferred that the floating element 8 substantially consist of plastic with a specific gravity of less than one, and it is more preferred that the floating element 8 substantially consist of high density polyethylene. In an embodiment, the floating element 8 is comprised of plastic and a foam, such as polystyrene, and in such an embodiment it is preferred that the plastic completely enclose the foam, and in such an embodiment it is possible for the plastic to have a specific gravity of more than one, as long as the foam present in the floating element causes the floating element as a whole to be buoyant.

The floating element 8 may further comprise one or more dial display openings 16. One of the dial sections 12 may further comprise pound number surface 32 and the other dial section 12 may further comprise an ounce number surface 36. In a preferred embodiment, the dial display openings 16 permit the view of only the desired numbers and that have been printed on the pound number surface 32 and ounce number surface 36 to be readable, while not revealing the other numbers printed on the pound number surface 32 and ounce number surface 36. This is a preferred, though not required, configuration, as it improves readability of the device.

It is preferred that, on the surface of the center section 10, adjacent to the dial display opening 16 which permits the view of the pound number surface 32 is a pound indicator 34, which indicates to the user that the number being viewed through that particular display opening 16 is a weight in pounds. Similarly, it is preferred that, on the surface of the center section 10, adjacent to the dial display opening 16 which permits the view of the ounce number surface 36 is an ounce indicator 38, which indicates to the user that the number being viewed through that particular display opening 16 is a weight in ounces.

The floating element 8 may further comprise a ring extension 30. The ring extension 30 permits the attachment of the cable element 4 to the floating element 8. Any suitable manner known by those of ordinary skill in the art for attaching the cable element 4 to the floating element 8 is acceptable, and the ring extension 30 may be of any suitable general shape, though a substantially circular protrusion from the center section 10 is preferred.

In a particularly preferred embodiment of the present invention, the floating element 8 comprises a center section 10 and two dial sections 12. The center section 10 comprises a ring extension 30, two dial mount mechanisms 14, and two dial display openings 16. The dial mount mechanisms 14 are on substantially opposite sides of the center section 10. Each dial section 12 is attached to the center section 10 on substantially opposite sides of the center section through rotatable attachment to a dial mount mechanism 14.

In this particularly preferred embodiment, each dial mount mechanism 14 comprises a button 18, an axle 20, and a spring 22. The axle 20 is a substantially cylindrical piece extending from the center section 10 and having a groove 24 bisecting the axle 20 through a diameter of the axle. The button 18 is a substantially flat piece residing at least partially within the groove 24 and having at least one locking peg 26 extending therefrom. The spring 22 resides at the base of and at least partially within the groove 24 such that the spring 22, when compressed, provides a force parallel to the height of the axle 20 and along the groove 24 against the button 18 away from the center of the center section 10. The angler may press and release the button 18 through a depression extension 42, which is a protrusion on the button 18 extending through the dial section 12 and at least partially beyond the end of the axle 20.

In this particularly preferred embodiment, the dial sections 12 each comprise a series of peg-accepting notches 28, and the peg-accepting notches 28 are circumferentially equidistant from one another. Each dial section 12 may be independently rotated around the axle 20 upon depression of the button 18 and compression of the spring 22, thereby disengaging the at least one locking peg 26 from a peg-accepting notch 28. Upon raising the button 18 and the expansion of the spring 22, the at least one locking peg 26 may engage a peg-accepting notch 28.

In this particularly preferred embodiment, one end of the cable element 4 is attached to the ring extension 30 of the center section 10, and the other end of the cable element 4 is attached to the retainer element 6. The cable element 4 comprises a flexible metal cable that has been coated in a thin plastic layer.

In this particularly preferred embodiment, each dial section 12 has sixteen peg-accepting notches 28. The peg-accepting notches 28 on each dial are circumferentially equidistant from one another, are substantially identical in size and shape, reside within a concave portion of the dial section 12, which faces towards the center section 10, and are substantially complimentary in shape to the one or more locking pegs 26. One dial section 12 further comprises a pound number surface 32, and the other dial section 12 further comprises an ounce number surface 36. Both the pound number surface 32 and the ounce number surface 36 are numbered in consecutive whole number integers from zero to fifteen. The center section 10 further comprises a pound indicator 34 and an ounce indicator 38.

In this particularly preferred embodiment, each dial section 12 further comprises eight dial grips 40, circumferentially equidistant from one another.

In this particularly preferred embodiment, a number on the pound number surface 32 is visible through the dial display opening 16 adjacent to the pound indicator 34, and a number on the ounce number surface 36 is visible through the dial display opening 16 adjacent to the ounce indicator 38. The angler may adjust the number visible on the pound number surface 32, the ounce number surface 36, or both, by pressing the depression extension 42 on the button 18 downward, thereby compressing the spring 22 and disengaging one or more locking pegs 26 from one or more peg-accepting notches 28, and rotating the desired dial 12 until the desired number appears in the respective dial display opening 16. Then the angler will release the depression extension 42, thereby expanding the spring 22, and engaging the one or more locking pegs 26 into one or more peg-accepting notches 28.

In an embodiment, the dial sections 12 may further comprise dial grips 40, which may be of any suitable shape or size known to those of ordinary skill in the art, to serve the purpose of enabling the angler to grip the dial section 12 and rotate it around the axle 20.

The present invention further includes an embodiment where the floating element 8 comprises a center section 10 and a single dial section 12, wherein the pound number surface 32 and ounce number surface 36 are one in the same.

The present invention further comprises a method of culling fish, the method comprising the steps of catching a first fish, weighing the first fish, adjusting a culling device 2 to indicate the weight of the first fish, and attaching the culling device to the first fish. Preferably, the method further comprises the steps of catching a second fish, weighing the second fish, determining that the second fish has a greater weight than the first fish, adjusting a culling device 2 to indicate the weight of the second fish, and attaching the culling device to the second fish. The culling device being used on the aforementioned second fish may or may not be the same culling device being used on the aforementioned first fish. The angler may optionally remove the culling device from the first fish, and use that device on the second fish, or he may place a different culling device on the second fish, and subsequently remove the culling device from the first fish and return the first fish to the wild.

The present invention further includes a kit, the kit potentially comprising a plurality of culling devices 2. The kit may also further comprise a scale.

It should be understood that the aforementioned embodiments are for exemplary purposes only and are merely illustrative of the many possible specific embodiments that can represent applications of the principles of the invention.

Without departing from the spirit and scope of this invention, one of ordinary skill in the art can make various changes and modifications to the invention to adapt it to various usages and conditions, including those not specifically laid out herein. As such, those changes and modifications are properly, equitably, and intended to be, within the full range and scope of equivalents of the invention disclosed and described herein.

We claim:

1. A device for identifying a weight of a caught animal comprising:
a retainer adapted to attach to the animal;
a floating element comprising a center section and two dial sections attached to opposite ends of the center section such that the center section is located between the dial sections, the dial sections being mounted to the center section so as to be independently rotatable with respect to the center section and each other, the center section defining at least two openings, the dial sections being rotatable to display indicia that designate a weight of the animal, the center section further comprising a biasing member for selectively locking the dial sections in a chosen position and unlocking the dial sections so as to be freely rotatable, and wherein an outer surface of each of the dial sections is exposed 360 degrees about the dial section's rotational axis such that a user may easily grip the dial section to rotate it, wherein each dial section comprises an extension defining a unit surface bearing a plurality of indicia and the center section defines at least two openings, wherein only one of the plurality of indicia of each dial section's unit surface can be substantially viewed through one of the plurality of openings and such that each dial section can be rotated to display a selected one of the respective dial section's plurality of indicia through one of the plurality of openings.

2. A culling device comprising a cable element, a retainer element, and a floating element, wherein the floating element comprises a center section and two dial sections, and
wherein the center section comprises two dial mount mechanisms,
wherein the dial mount mechanisms are on substantially opposite sides of the center section and wherein each dial section is attached to the center section on substantially opposite sides of the center section through rotatable attachment thereof,
wherein each dial mount mechanism comprises a button, an axle, and a spring,
where the axle is a substantially cylindrical piece extending from the center section and having a groove bisecting the axle through a diameter of the axle, the button is a substantially flat piece residing at least partially within the groove and having at least one locking peg extending therefrom, and the spring resides at a base of and within the groove such that the spring, when compressed, provides a force parallel to a height of the axle and along the groove against the button away from a center of the center section, and
wherein the dial sections each comprise a series of peg-accepting notches, the peg-accepting notches being circumferentially equidistant from one another,
wherein each dial element may be independently rotated around the axle upon depression of the button and compression of the spring, thereby disengaging the at least one locking peg from one of the series of a peg-accepting notches, and upon the raising of the button and the expansion of the spring, the at least one locking peg may engage one of the series of peg-accepting notches, and
wherein one end of the cable element is attached to a ring extension of the center section, and the other end of the cable element is attached to the retainer element.

3. The culling device of claim 2 wherein the center section further comprises two dial display openings.

4. The culling device of claim 2 wherein the cable element comprises a flexible material.

5. The culling device of claim 4 wherein the cable element comprises a flexible metal cable that has been coated in a thin plastic layer.

6. The culling device of claim 5 wherein one of the two dial sections further comprises a pound number surface, and the other of the two dial sections further comprises an ounce number surface, and wherein both the pound number surface and the ounce number surface are numbered in consecutive whole number integers from zero to fifteen.

7. The culling device of claim 6 wherein the center section further comprises a pound indicator and an ounce indicator.

8. The culling device of claim 2 wherein each dial section has sixteen peg-accepting notches.

9. The culling device of claim 2 wherein each dial section further comprises one or more dial grips.

10. The culling device of claim 9, wherein each dial section further comprises eight dial grips, circumferentially equidistant from one another.

* * * * *